United States Patent
Gupta et al.

(10) Patent No.: US 6,858,240 B2
(45) Date of Patent: Feb. 22, 2005

(54) CARBON DIOXIDE-HYDRATE PRODUCT AND METHOD OF MANUFACTURE THEREOF

(75) Inventors: Ashis Gupta, Duluth, GA (US); Bradley C. Dimmel, Roswell, GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 10/414,383

(22) Filed: Apr. 15, 2003

(65) Prior Publication Data

US 2003/0219521 A1 Nov. 27, 2003

Related U.S. Application Data

(63) Continuation of application No. 09/696,508, filed on Oct. 25, 2000, now Pat. No. 6,576,276.

(51) Int. Cl.[7] .............................. A23L 2/40; A23G 3/00
(52) U.S. Cl. ...................... 426/67; 426/565; 426/561; 426/524; 426/591; 62/48
(58) Field of Search ................. 426/565, 591, 426/561, 524, 67; 62/48

(56) References Cited

U.S. PATENT DOCUMENTS

| | | |
|---|---|---|
| 850,607 A | 4/1907 | Schroder |
| 1,415,325 A | 5/1922 | Ellis |
| 1,659,431 A | 2/1928 | Josephson |
| 1,875,164 A | 8/1932 | Schlumbohm |
| 1,920,082 A | 7/1933 | Josephson |
| 2,029,025 A | 1/1936 | Justheim ........................ 99/11 |
| 2,240,769 A | 5/1941 | Glazer ........................ 62/108 |
| 2,354,732 A | 8/1944 | Baird ........................ 62/91.5 |
| 2,361,137 A | 10/1944 | Terry et al. .................... 261/11 |
| 2,411,081 A | 11/1946 | Carothers ..................... 62/114 |
| 2,575,509 A | 11/1951 | Bayston ........................ 62/172 |
| 2,590,542 A | 3/1952 | Jones ........................... 252/67 |
| 2,975,603 A | 3/1961 | Barnes ............................. 62/1 |
| 3,098,361 A | 7/1963 | Haase .............................. 62/1 |
| 3,220,204 A | 11/1965 | Adler et al. .................... 62/70 |

(List continued on next page.)

FOREIGN PATENT DOCUMENTS

| | | |
|---|---|---|
| EP | 0201 143 | 12/1986 |
| EP | 0 855 141 A1 | 7/1988 |
| EP | 0 330 578 A2 | 8/1989 |
| EP | 0 330 578 A3 | 8/1989 |
| EP | 0 395 145 A2 | 10/1990 |
| EP | 0 336 501 B1 | 6/1992 |
| EP | 0545 296 A1 | 6/1993 |
| EP | 0 651 727 B1 | 3/1997 |
| EP | 0675 685 B1 | 5/1997 |
| EP | 0 965 563 A1 | 12/1999 |
| JP | 0 1 219 460 | 9/1989 |

OTHER PUBLICATIONS

Morgan et al., *Hydrate Formation from Gaseous $CO_2$ and Water*, Environ. Sci. Technol., 1999, 33, 1448–1452.

North et al, *Studies of $CO_2$ Hydrate Formation and Dissolution*, Environ. Sci. Technol., 1998, 32, 676–681.

*Primary Examiner*—N. Bhat
(74) *Attorney, Agent, or Firm*—Sutherland Asbill & Brennan LLP

(57) ABSTRACT

A method for preparing a frozen carbonated beverage that remains stable at home freezer temperatures as well as commercial freezer temperatures, and a frozen carbonated beverage produced by said method. According to a preferred method of the invention, carbon dioxide-hydrate is prepared, ground, and mixed with a frozen flavored syrup component. The resulting mixture is compacted and packaged for storage and shipping.

20 Claims, 1 Drawing Sheet

U.S. PATENT DOCUMENTS

| | | | |
|---|---|---|---|
| 3,255,600 A | 6/1966 | Mitchell et al. | 62/69 |
| 3,291,076 A | 12/1966 | Flanigan et al. | 107/1 |
| 3,333,969 A | 8/1967 | Mitchell et al. | 99/192 |
| 3,360,384 A | 12/1967 | Kurzinski et al. | 99/192 |
| 3,477,244 A | 11/1969 | Scoggins | 62/306 |
| 3,533,537 A | 10/1970 | Hazlewood | 222/146 |
| 3,647,472 A | 3/1972 | Speech et al. | 99/34 |
| 3,726,102 A | 4/1973 | Parks | 62/70 |
| 3,791,159 A | 2/1974 | Devlin | 62/68 |
| 3,826,829 A | 7/1974 | Marulich et al. | 426/190 |
| 3,985,909 A | 10/1976 | Kirkpatrick | 426/572 |
| 3,985,910 A | 10/1976 | Kirkpatrick | 426/572 |
| 4,001,457 A | 1/1977 | Hegadorn | 426/572 |
| 4,031,262 A | 6/1977 | Nakayama et al. | 426/565 |
| 4,068,010 A | 1/1978 | Karr | 426/477 |
| 4,285,977 A * | 8/1981 | Yezek et al. | 426/67 |
| 4,310,559 A | 1/1982 | Mita et al. | 426/101 |
| 4,333,315 A | 6/1982 | Zemelman et al. | 62/1 |
| 4,347,707 A | 9/1982 | Zemelman et al. | 62/69 |
| 4,393,660 A | 7/1983 | Kleiner et al. | 62/69 |
| 4,394,153 A | 7/1983 | Reap | 71/92 |
| 4,398,394 A | 8/1983 | Kleiner et al. | 62/1 |
| 4,398,395 A * | 8/1983 | Hinman et al. | 62/1 |
| 4,404,807 A | 9/1983 | Zemelman et al. | 62/1 |
| 4,487,023 A * | 12/1984 | Hegadorn et al. | 62/1 |
| 4,738,862 A | 4/1988 | Bee | 426/565 |
| 4,753,082 A | 6/1988 | Sudo et al. | 62/69 |
| 4,850,269 A | 7/1989 | Hancock et al. | 99/323.1 |
| 4,923,644 A | 5/1990 | Kuckens | 261/29 |
| 4,930,319 A | 6/1990 | Bee et al. | 62/69 |
| 4,934,153 A | 6/1990 | Ebinuma et al. | 62/66 |
| 4,979,647 A | 12/1990 | Hassell | 222/146.6 |
| 5,080,261 A | 1/1992 | Green | 222/129.1 |
| 5,140,822 A | 8/1992 | Gupta | 62/50.1 |
| 5,231,851 A | 8/1993 | Adolfsson | 62/48.2 |
| 5,443,763 A | 8/1995 | Notar et al. | 261/140.1 |
| 5,562,891 A | 10/1996 | Spencer et al. | 423/437 R |
| 5,698,247 A | 12/1997 | Hall | 426/66 |
| 5,728,419 A | 3/1998 | Caron et al. | 426/565 |
| 5,783,239 A | 7/1998 | Callens | 426/68 |
| 5,968,573 A | 10/1999 | Kaufman | 426/410 |
| 5,968,753 A | 10/1999 | Tseng-Law et al. | 435/7.21 |

* cited by examiner

CARBON DIOXIDE-HYDRATE PRODUCT AND METHOD OF MANUFACTURE THEREOF

CROSS-REFERENCED TO RELATED APPLICATIONS

This application is a continuation of U.S. patent application Ser. No. 09/696,508 filed on Oct. 25, 2000 now U.S. Pat. No. 6,576,276.

BACKGROUND OF THE INVENTION

The present invention relates to a frozen carbonated product, and more particularly to a frozen $CO_2$-hydrate food product, such as a frozen carbonated beverage, and method of making the same.

Various methods of preparing effervescent ice confection products, such as $CO_2$-hydrate-containing confections are well known. See, for example, U.S. Pat. No. 4,738,862. In general, these techniques involve contacting water with $CO_2$ under pressure and reducing the temperature until a solid $CO_2$-water clathrate, also termed $CO_2$-hydrate, is formed. The hydrate is then ground, producing particles of the frozen $CO_2$-hydrate, which can then be mixed with a flavored confection phase, followed by freezing the resulting mixture.

One of the problems with prior art methods of producing $CO_2$-hydrate products is that insufficient carbonation is achieved. This results in a frozen product that, while adequate from the standpoint of sweetness and flavor, lacks sufficient carbonation to produce the feel in the mouth consumers associate with carbonated liquid beverages.

Other shortcomings of the prior art include relatively long reaction times being required for preparation of the $CO_2$-hydrate, and minimal throughput, with the result that until now there has been no commercially viable process available for the production of a $CO_2$-hydrate ice confection product.

Yet another problem with the prior art is the instability of the $CO_2$-hydrate, which loses carbonation rapidly during the first 24 hours after formation. To slow the rate of loss of carbonation, it is often necessary to maintain the hydrate under severe temperature or pressure conditions that are not commercially feasible for the home user market, wherein home freezers operate at atmospheric pressure and around $-10$ to $+5°$ Fahrenheit.

Another drawback with prior art processes is that they do not readily lend themselves to preparation of a diet product. Diet products have no sugar, and do not behave the same as sugar-containing products upon freezing. Until now, there has been no commercial process available for producing an artificially sweetened $CO_2$-hydrate product.

Still another drawback with prior art methods of producing $CO_2$-hydrate products is the tendency of such products to "explode" or "pop," i.e., disintegrate unpredictably with a loud noise, particularly when immersed in liquid. One possible explanation for this is the formation of dry ice during the carbon dioxide hydration process.

Accordingly, an improvement in the art could be realized if a carbon dioxide-hydrate product could be developed that addressed some or all of the aforementioned shortcomings.

SUMMARY OF THE INVENTION

The present invention provides a method for manufacturing a frozen carbonated confection product that exhibits high $CO_2$ retention without significant dry ice formation and stable storage in the home freezer environment. As used herein, the term "stable" is intended to mean that the frozen carbonated confection product can be stored at typical home freezer temperatures for typical storage durations without losing significant amounts of $CO_2$. According to a preferred method of practicing the invention, water at ambient pressure is charged to a reactor and subjected to an inert gas purge, preferably using $CO_2$, to minimize air entrainment in the resulting frozen product. Air entrainment can result in lower $CO_2$ retention levels. After the purge, the water is chilled to just above the freezing point, preferably to $32.1°$ F. The chilled water is agitated, and carbon dioxide under pressure, preferably about 400 psig, is introduced into the reactor where the $CO_2$-hydrate reaction is allowed to proceed with continued agitation for about thirty minutes. The reaction mixture is then cooled to about $-5°$ F., resulting in a solid $CO_2$-hydrate containing product, which is then ground to an acceptable particle size. Preferably following grinding, or alternatively prior to or during grinding of the $CO_2$-hydrate product, a flavored syrup is mixed with the $CO_2$-hydrate product, and the resulting product is dispensed, preferably incorporating a compacting step, for packaging and storage.

These and other advantages and preferred embodiments of the invention will become more readily apparent as the following detailed description of the preferred embodiments proceeds, particularly with reference to the appended drawing.

BRIEF DESCRIPTION OF THE DRAWING

The present invention will be more fully understood from the detailed description below when read in connection with the accompanying drawing wherein like reference numerals refer to like elements and wherein.

DETAILED DESCRIPTION OF THE PREFERRED EMBODIMENT

Figure 1:
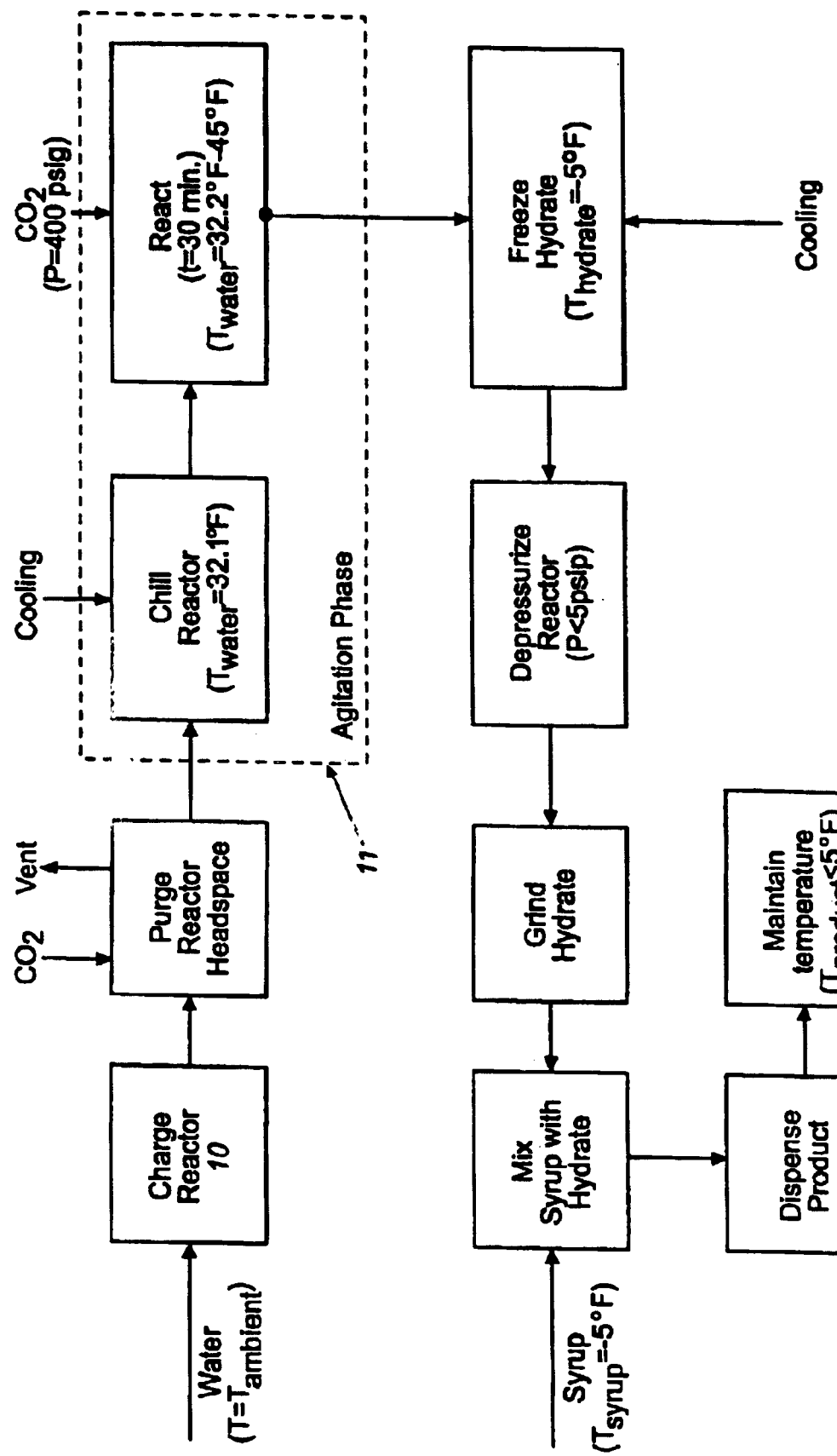
FIG. 1 is a schematic flow chart of a preferred method of practicing the present invention.

Clathrates are compounds comprising two types of molecules, where one type of molecule, known as the guest molecule, occupies a cavity which is found in the crystal lattice structure of another type of molecule. In one specific type of clathrate known as a clathrate hydrate, the guest molecule occupies cavities in the crystal lattice structure of water. One particular type of hydrate of interest is carbon dioxide hydrate, a compound in which carbon dioxide molecules reside in a cage-shaped structure enclosed by a plurality of water molecules. Also referred to herein as $CO_2$-hydrate, and represented theoretically by the formula $[CO_2 \cdot (5.75)H_2O]$, clathrate $CO_2$-hydrates form when carbon dioxide gas is combined with water at a predetermined pressure and temperature. Although subject to various phase changes depending on the pressure and temperature, for present purposes, the $CO_2$-hydrates are solid, ice-like compositions that form according to an exothermic reaction as follows:

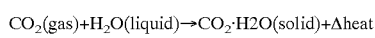

$$CO_2(gas) + H_2O(liquid) \rightarrow CO_2 \cdot H2O(solid) + \Delta heat$$

The theoretical ratio of $CO_2$ to $H_2O$ in $CO_2$-hydrate is 1:5.75. The $H_2O$ molecule lattice structure, however, comprises two small cavities and six large cavities, each of which may be occupied by a molecule of $CO_2$. Thus, the number of $CO_2$ molecules enclosed in this lattice may vary from 1 to 8, depending on the specific temperature and pressure conditions under which the hydrates are formed. In general, increasing the pressure under which hydrate formation occurs increases the number of $CO_2$ molecules that become "trapped" in the ice lattice structure, or, possibly, joined by a loose chemical bond. Also, in general, increasing the number of trapped or bonded $CO_2$ molecules increases the ultimate $CO_2$ retention of a resulting frozen confection product incorporating the $CO_2$-hydrate.

Referring now to FIG. 1, according to a highly preferred embodiment of the present invention, water, preferably purified and distilled, is charged to a pressure reactor 10 at ambient temperature. Purified/distilled water is preferred to minimize the inclusion of salts and other impurities in the water, which can be detrimental to the $CO_2$-hydrate reaction and/or the resulting carbonation level and/or product shelf life. The reactor may be any suitable reactor equipped with an agitator, such as a stirrer or shaking device, and capable of maintaining the pressure and temperature described herein. After being charged to the reactor, the water is then preferably subjected to a gas purge, using, for example, a $CO_2$ purge. This purge evacuates air from the headspace of the reactor and thereby minimizes air entrainment in the water during agitation. Air entrainment reduces the $CO_2$ retention levels of the resulting product. Other gasses than $CO_2$ can be used for the purge, provided the purge gas is inert, such as nitrogen, however, $CO_2$ is the preferred purge gas for the present invention. The purge gas may be introduced at any suitable pressure, including atmospheric pressure or under higher pressures. Most preferably, a slight positive pressure is used for the purge gas relative to the head space pressure of the reactor in order to better purge the head space of the resident air or other gas contained therein. While it is preferred to perform the gas purge after charging water to the reactor, it would also be possible to purge the reactor of air using an inert gas prior to charging the reactor with water. Alternatively, rather than using an inert purge gas, the reactor can be evacuated of air by drawing a vacuum either before or after being charged with water.

Following the purge step, the purged water is then subjected to an agitation phase, 11. During this phase, the water is chilled to near freezing, i.e., greater than 32° F. and less than or equal to about 32.2° F., with agitation. Most preferably, the water is chilled to about 32.1° F. The agitation helps increase surface interactions for formation of $CO_2$-hydrate, and also provides a uniform chill temperature, most preferably 32.1° F. at the outset of the $CO_2$-hydrate reaction. It has been found that the 32.1° F. temperature of the reactants at the outset of the $CO_2$-hydrate reaction is critical to achieving the superior results of the present invention relative to the prior art.

Agitation is also an important aspect of a highly preferred embodiment of practicing the present invention. The agitator may, for example, be any standard implement for providing rotational mixing, such as a paddle, or may be a shaker or other agitation mechanism, such as an ultrasonic device. Any form of agitation can be used, provided that it provides sufficient mixing to promote the $CO_2$-hydrate reaction, and that it permits adequate mixing of the reactants at the outset of the reaction to achieve a uniform temperature, preferably 32.1° F., but that does not impart so much energy to the reactants as to raise the temperature of the reactants beyond the preferred range. In a preferred embodiment of the invention, where the agitator comprises a paddle, the paddle includes a slightly curved top portion to provide vertical mixing.

Once the water is chilled to the desired temperature, $CO_2$ under pressure, preferably 300–500 psig, and most preferably about 400 psig, is charged to the reactor, preferably while the water continues to be agitated, although agitation is not required while the $CO_2$ is being charged to the reactor. The reaction is allowed to proceed with agitation for about 5–60 minutes, and preferably for about 30 minutes, during which time the temperature of the reactants rises to about 32.2–45° F. due to the exothermic nature of the reaction. Agitation has been found to be critical to achieving high $CO_2$ levels in the resulting $CO_2$-hydrate. Following the reaction, the agitation is discontinued and the agitator is preferably lifted out of the reactants to avoid becoming frozen therein. The reactants are chilled to subfreezing, preferably about −5° F. or less. During this phase, the solid $CO_2$-hydrate is stabilized. The finished $CO_2$-hydrate preferably achieves $CO_2$ content of up to about 12% wt/wt $CO_2$ gas.

Following the freezing step, the reactor is depressurized, preferably without exposing the system to the atmosphere, although exposing to atmosphere can alternatively be done. When the system is not to be exposed to atmosphere, this is accomplished by maintaining a closed system, wherein the system is depressurized by bleeding $CO_2$ from the reactor, such that the $CO_2$-hydrate remains under an atmosphere of $CO_2$, but at or near atmospheric pressure. Alternatively, the pressure in the system can be reduced, without completely depressurizing the system to atmospheric pressure, for example, maintaining a slight positive pressure of around 5 psig. Of course, the reactor can also be depressurized and then immediately exposed to the atmosphere.

After depressurization, the solid $CO_2$-hydrate is ground, either in the closed system or exposed to atmosphere, until it achieves a consistency of fine powder, which aids in mixing. Preferably, the grinding step is accomplished at a temperature, e.g., −5° F., that precludes significant melting of the $CO_2$-hydrate. In a preferred embodiment of the invention, the agitator is fitted with knife blades that permit the same mechanism used for providing agitation to also be used to grind the frozen $CO_2$-hydrate product.

In a highly preferred embodiment of the invention, after the grinding step, a flavored syrup or concentrate is added to the ground $CO_2$-hydrate and mixed therewith. Preferably, the syrup is introduced in a chilled form, at a temperature of about −5° F. At such temperatures, the syrup assumes the consistency of a semi-solid, such as ice cream at similar temperatures, or may be sufficiently solid as to require grinding prior to mixing. The mixing is accomplished with sufficient shear to provide adequate blending of the syrup with the $CO_2$-hydrate, but not so much as to liquefy the components or release significant amounts of $CO_2$. When completed, the resulting mixture has a uniform color and the consistency of a loosely packed solid, like brown sugar. The mixing step may be accomplished in the closed system or after the system has been opened to the atmosphere. As the following examples demonstrate, it is also possible to add the flavored syrup component immediately after formation of the $CO_2$-hydrate, but prior to the grinding step (Example 3). For sugar-containing syrups, it is preferred not to add the syrup prior to completion of the $CO_2$-hydrate reaction, as the presence of sugar-containing syrup tends to make the reaction less stable, as the syrup tends to foam. It is, however, possible to add sugar-containing syrups at more than one step in the process after the $CO_2$-hydrate reaction is complete. On the other hand, when an artificially-sweetened syrup, such as diet Coke® syrup is used, it has been found, surprisingly, that such syrup behaves like water, in that it does not foam excessively when added prior to the CO2-hydrate reaction, and can thus be added prior to the $CO_2$- hydrate reaction. For diet syrups, therefore, it is possible to add the syrup at any step and more than one step in the process, provided that care is taken not to remove flavor volatiles during the initial purge step.

Following mixing, the resulting product is preferably permitted to degas, to prevent swelling of the packaging. This step may be accomplished by permitting the finished product to degas for a 24-hour period at a temperature of about −5° C., or could be achieved by allowing the $CO_2$-hydrate to degas prior to mixing with the syrup component.

After the degassing step, the ground $CO_2$-hydrate product is preferably subjected to a compacting step, wherein the product is compressed into a shape convenient for consumer use, such as an ice pop on a stick or in a container, such as a paper or plastic cup, box, or bowl. Such compression may be achieved using known methods. It is believed that compression may increase the shelf life of the $CO_2$-hydrate product. Compression is not used, however, when another preferred embodiment of the invention is prepared, wherein the product is permitted to achieve the consistency of ice cream and is frozen in containers without compaction. In this embodiment, the ice cream consistency is achieved by imparting sufficient mixing and/or adding sufficient syrup to allow the mixture to achieve the smooth, creamy consistency normally associated with an ice cream or sherbet product. When an ice cream version of the product is prepared according to the present invention, because there is no compaction, it is preferred that the product be stored at slightly colder temperatures, e.g., 0° F. or lower.

The syrup used in practicing the present invention may, for example, be of the type commercially available from The Coca-Cola Company, Atlanta, Ga., and used by customers at fountain outlets after being mixed with carbonated water provided by the customer. In a highly preferred embodiment of the invention, the syrup is a diet formulation, such as diet Coke®. Particularly when diet syrup is used, it has been found that better results are achieved by incorporating an emulsifier, such as pectin or guar gum into the product during mixing, to prevent separation.

The finished product is then packaged, for example, with a suitable wrapper and boxed for storage and shipping. Of course, the product is maintained at sub-freezing temperatures throughout this step. It has been found that products produced according to the present invention exhibit improved shelf life and can be stored at temperatures typical of household freezers, generally about −10° F. to about 5° F. Of course, the product of the present invention can be stored at colder temperatures than home freezer temperatures, such as those temperatures typical of commercial freezer distribution channels. As will now be apparent, the preferred method of the present invention can be carried out as a batch or continuous process. A batch process, however, is more highly preferred.

EXAMPLES

Example 1

1.8 grams of pectin and 0.18 grams of guar gum were dissolved in 970 grams of distilled water at 120° F. The solution was cooled to room temperature and to it 529 grams of diet Coke® syrup was added. The liquid was hydrated with $CO_2$ at 400 psig according to the procedures described herein. The product was like dry sand. The carbonation level of the product was between 10.5 and 11.2% by weight.

Example 2

5.15 grams of pectin and 0.515 grams of guar gum were dissolved in 1,125 grams of water at 120° F. The solution was cooled to room temperature. To it 472.5 grams of diet Coke® syrup was added. The liquid was then hydrated according to the above procedures. The product was frozen solid with no visible separation of the syrup. Carbonation level of the product in this example was between 6.7 and 8.1% by weight.

Example 3

900 grams of distilled water was placed in a 2L reactor. A $CO_2$ hydration reaction was carried out as described herein at 400 psig in an ice bath. After the reaction, the $CO_2$-hydrate temperature was between 32.2 and 32.4° F., and 765 grams of Coke® syrup at 0° F. was pumped into the reactor. The reactor was then stored in a −5° F. freezer at least overnight (and up to two days over weekends). The reactor was opened and the product was ground. The experiment was repeated four times to determine repeatability and shelf life. Results are shown below.

| Sample No. | Days after Grinding | Brix | Carbonation Level by weight |
| --- | --- | --- | --- |
| 1 | 0 | 24.6 | 4.2% |
|   | 1 | 21.2 | 2.6% |
|   | 2 | 20.0 | 2.4% |
|   | 3 | 21.4 | 2.3% |
|   | 10 | 20.2 | 2.1% |
| 2 | 0 | 22.2 | 4.8% |
|   | 1 | 22.2 | 2.5% |
|   | 2 | 22.5 | 3.5% |
|   | 9 | 25.8 | 2.4% |
| 3 | 0 | 20.5 | 5.5% |
|   | 1 | 21.0 | 2.8% |
|   | 8 | 21.1 | 2.4% |
| 4 | 0 | 24.9 | 4.9% |
|   | 7 | 25.2 | 2.4% |

Example 4

This experiment was conducted to determine optimal hydration reaction time. A reactor was filled with 1.5 L of distilled water at room temperature. The reactor was then purged three times with $CO_2$ at 100 psig. The unpressurized reactor was then placed in an ice bath and agitated until the water temperature reached about 32.2° F. At this point carbon dioxide gas was introduced to the reactor at 400 psig. The reaction was allowed to proceed with agitation, while continuing to introduce $CO_2$ at 400 psig, for predetermined lengths of time, e.g., 5, 10, 30, and 60 minutes. After the predetermined time for each reaction time, the $CO_2$ was shut off to the reactor and the reactor was placed in a −5° F. room overnight. The next morning the reactor was depressurized and opened and the level of carbonation measured. As a result of these experiments, it was determined that about 50% of the $CO_2$-hydrate hydrate reaction takes place in the first five minutes of reaction time, about 75% after 10 minutes, and almost 90% after 30 minutes. About 13% w/w $CO_2$ was obtained after 60 minutes of reaction time. From this data, it appears that optimum reaction time for the $CO_2$ hydration reaction of the present invention should be between about 10 and 30 minutes.

While the preferred embodiment of this invention has been described above in detail, it is to be understood that variations and modifications can be made therein without departing from the spirit and scope of the present invention, as delineated by the following claims, including all equivalents thereof.

What is claimed is:

1. A method for preparing a frozen carbonated product comprising the steps of:
   a) contacting $CO_2$ under pressure with an aqueous liquid in a chilled reaction vessel;
   b) agitating said aqueous liquid and $CO_2$ in said reaction vessel to promote a reaction between said $CO_2$ and aqueous liquid, thereby forming a $CO_2$-hydrate containing product;
   c) cooling said $CO_2$-hydrate containing product to promote freezing thereof in said reaction vessel ad form a solid $CO_2$-hydrate containing product;
   d) grinding said $CO_2$-hydrate containing product to form $CO_2$-hydrate containing particles; and
   e) forming said $CO_2$-hydrate containing particles into a frozen carbonated product.

2. The method of claim 1 wherein said aqueous liquid is chilled to greater than 32° F. but less than 32.2° F. prior to introducing said $CO_2$ and said $CO_2$ is introduced to said reaction vessel at a pressure of about 300–500 psig.

3. The method of claim 1 wherein at the outset of said reaction, the aqueous liquid is at a temperature of about 32.1° F.

4. The method of claim 1 wherein said $CO_2$ under pressure and said aqueous liquid are reacted with agitation for about 5–60 minutes.

5. The method of claim 1, wherein air is removed from said reaction vessel before reacting said $CO_2$ under pressure with said water.

6. The method of claim 1, further comprising subjecting said reaction vessel to an inert gas purge.

7. The method of claim 1, wherein the said solid $CO_2$-hydrate containing product is ground in said reaction vessel.

8. The method of claim 7, wherein the step of agitation is carried out with an agitator disposed in the reaction vessel and said solid $CO_2$-hydrate containing product is ground with said agitator.

9. The method of claim 1, wherein following the forming of said frozen carbonated product, the temperature thereof is maintained sufficiently cold to maintain said product in a frozen state.

10. The method of claim 1, wherein steps a–d are conducted in a closed system.

11. The method of claim 1, wherein steps a–c are conducted in a closed system and steps d–e are conducted at atmospheric pressure.

12. The method of claim 1, wherein a flavored syrup is added to the said $CO_2$-hydrate containing particles and mixed therewith, thereby forming a flavored frozen carbonated product.

13. A method of preparing a carbonated ice product comprising the steps of:
   (a) charging a reaction vessel with water, and subjecting said reaction vessel charged with water to an inert gas purge;
   (b) while agitating said water in the reaction vessel, cooling said water in the reaction vessel to a temperature slightly above its freezing point;
   (c) charging said reaction vessel with $CO_2$ under pressure to provide a $CO_2$-water mixture;
   (d) agitating the $CO_2$-water mixture while reacting said mixture in the reaction vessel to provide a product comprising $CO_2$-hydrate;
   (e) lowering the temperature of said product to promote freezing thereof in the reaction vessel;
   (f) depressurizing said reaction vessel;
   (g) grinding said product to form a ground product; and
   (h) dispersing said ground product.

14. The method of claim 13, wherein said frozen carbonates product is packaged after dispersing, after a degassing step.

15. The method of claim 13, wherein said forming step comprises compacting said solid $CO_2$-hydrate containing particles.

16. The method of claim 15, wherein said solid $CO_2$-hydrate containing particles are compacted in the form an ice pop together with a stick or for holding the compacted frozen carbonated product.

17. The method of claim 13, wherein said solid $CO_2$-hydrate containing product is ground to achieve the consistency of ice cream.

18. The method of claim 13, wherein said reaction proceeds for about 5–60 minutes.

19. The method of claim 13, wherein said inert gas used for said purge is $CO_2$.

20. A method of preparing a carbonated ice confection product, comprising the steps of:
   (a) charging a reaction vessel with water and purging the headspace of said charged reaction vessel with $CO_2$ gas;
   (b) chilling said water in said reaction vessel to about 32.1° F., while providing agitation to said water in the reaction vessel;
   (c) introducing $CO_2$ gas at a pressure of about 400 psig to said reaction vessel, and agitating the water and $CO_2$ in said reaction vessel, allowing an exothermic reaction of the water and $CO_2$ to proceed for about 30 minutes in the reaction vessel in the reaction vessel, thereby raising the temperature of the reactants to about 32.2–45° F., and thereby producing $CO_2$ hydrate;
   (d) discontinuing the agitation and cooling the $CO_2$ hydrate in the reaction vessel to about −50° F. or less;
   (e) slowly depressurizing the reaction vessel to about 5 psig or less;
   (f) grinding the $CO_2$ hydrate;
   (g) adding a flavored syrup to the ground $CO_2$ hydrate and mixing the syrup and $CO_2$-hydrate to produce the carbonated ice confection product;
   (h) compacting the carbonated ice confection product; and
   (i) storing the carbonated ice confection product at a temperature of less than about 5° F.

* * * * *